(12) United States Patent
Lu

(10) Patent No.: US 10,203,564 B2
(45) Date of Patent: Feb. 12, 2019

(54) ARRAY SUBSTRATE, LIQUID CRYSTAL MODULE AND DISPLAY DEVICE INCLUDING PIXEL SUB-UNITS HAVING DIFFERENT ELECTRIC FIELD INTENSITIES

(71) Applicant: BOE TECHNOLOGY GROUP CO., LTD., Beijing (CN)

(72) Inventor: Jiaoming Lu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 35 days.

(21) Appl. No.: 14/417,041

(22) PCT Filed: Apr. 30, 2014

(86) PCT No.: PCT/CN2014/076560
§ 371 (c)(1),
(2) Date: Jan. 23, 2015

(87) PCT Pub. No.: WO2015/100895
PCT Pub. Date: Jul. 9, 2015

(65) Prior Publication Data
US 2015/0378219 A1 Dec. 31, 2015

(30) Foreign Application Priority Data
Dec. 31, 2013 (CN) .......................... 2013 1 0753206

(51) Int. Cl.
*G02F 1/1343* (2006.01)
(52) U.S. Cl.
CPC .. *G02F 1/134309* (2013.01); *G02F 1/134363* (2013.01); *G02F 2001/134345* (2013.01)
(58) Field of Classification Search
CPC combination set(s) only.
See application file for complete search history.

(56) References Cited

U.S. PATENT DOCUMENTS

2002/0012084 A1 1/2002 Yoon et al.
2006/0152668 A1* 7/2006 Jang ..................... G02F 1/1339
349/156

(Continued)

FOREIGN PATENT DOCUMENTS

CN 101206359 A 6/2008
CN 202583658 U 12/2012

(Continued)

OTHER PUBLICATIONS

First Office Action regarding Chinese application No. 201310753206. 7, dated Oct. 9, 2015. Translation provided by Dragon Intellectual Property Law Firm.

(Continued)

*Primary Examiner* — Lauren Nguyen
(74) *Attorney, Agent, or Firm* — Harness, Dickey & Pierce, P.L.C.

(57) ABSTRACT

The present disclosure provides an array substrate, a liquid crystal module and a display device. The array substrate includes a plurality of pixel units. Each of the pixel units includes at least three pixel sub-units; each of the pixel sub-units includes at least one electric field unit group; the electric field unit group includes a pixel electrode and a common electrode; the first pixel sub-unit includes a first electric field unit group; the second pixel sub-unit includes a second electric field unit group corresponding to the first electric field unit group; the third pixel sub-unit includes a third electric field unit group corresponding to the first electric field unit group; the first electric field unit group, the second electric field unit group and the third electric field unit group have different electric field intensities.

16 Claims, 4 Drawing Sheets

(56) References Cited

U.S. PATENT DOCUMENTS

2007/0121047 A1* 5/2007 Chung .................. G02F 1/1323
349/141
2011/0149218 A1* 6/2011 Nakayama .............. B32B 37/02
349/106
2014/0176837 A1 6/2014 Rao et al.

FOREIGN PATENT DOCUMENTS

| CN | 102854675 A | 1/2013 |
| CN | 103176315 A | 6/2013 |
| CN | 103698942 A | 4/2014 |
| JP | 2009300627 A | 12/2009 |

OTHER PUBLICATIONS

Written Opinion of the International Searching Authority for international application No. PCT/CN2014/076560.
Third Office Action regarding Chinese application No. 201310753206.7, dated Oct. 26, 2016. Translation provided by Dragon Intellectual Property Law Firm.

* cited by examiner

ARRAY SUBSTRATE, LIQUID CRYSTAL MODULE AND DISPLAY DEVICE INCLUDING PIXEL SUB-UNITS HAVING DIFFERENT ELECTRIC FIELD INTENSITIES

CROSS-REFERENCE TO RELATED APPLICATIONS

The present application is the U.S. national phase of PCT Application No. PCT/CN2014/076560 filed on Apr. 30, 2014, which claims a priority of the Chinese patent application No. 201310753206.7 filed Dec. 31, 2013, the disclosure of which are incorporated in their in their entirely by reference herein.

TECHNICAL FIELD

The present application relates to the field of displaying technology, and more particularly relates to an array substrate, a liquid crystal module and a display device.

BACKGROUND

Thin film transistor liquid crystal displays (TFT-LCDs) have been widely used in various fields such as monitors, televisions, notebooks, and will still be the mainstream display technology in the next 20 to 30 years. At present, the development trend of the TFT-LCD technology is pursuit of high contrast and wide viewing angle, so as to obtain high-quality display effect.

TFT-LCD display modes may be divided into two kinds according to liquid crystal alignment results: one is vertical alignment (VA) mode which adopts vertically aligned liquid crystal molecules, has advantage of high contrast, but easily generates color shift or other phenomena, which may be caused by different liquid crystal phase retardation when viewing oblique or in front; another is in-plane switching mode which adopts horizontally aligned liquid crystal molecules, has advantage of wide viewing angle, but has low contrast.

For the vertical alignment mode, as shown in FIG. 1, when there is a certain angle defined between an alignment direction of liquid crystal and a glass substrate, a phase retardation value when viewing in a front viewing direction is smaller than a phase retardation value when viewing in an oblique viewing direction, which causes different transmittances at the front viewing direction and the oblique viewing direction, thereby appearing color shift.

SUMMARY

One object of the technical solution of the present application provides an array substrate, a liquid module and a display device, which can solve the problem of color shift caused by different transmittances at different directions when the liquid crystal module in the related art adopts the vertical alignment mode.

The present disclosure provides an array substrate, including a plurality of pixel units. Each of the pixel units includes at least three pixel sub-units; each of the pixel sub-units includes at least one electric field unit group; the electric field unit group includes a pixel electrode and a common electrode; the first pixel sub-unit includes a first electric field unit group; the second pixel sub-unit includes a second electric field unit group corresponding to the first electric field unit group; the third pixel sub-unit includes a third electric field unit group corresponding to the first electric field unit group; the first electric field unit group, the second electric field unit group and the third electric field unit group have different electric field intensities.

Optionally, in the above array substrate, in pixel electrodes and common electrodes which constitute the first electric field unit group, the second electric field unit group and the third electric field unit group, respectively, distances between the pixel electrodes and the common electrodes are different, respectively.

Optionally, in the above array substrate, in pixel electrodes and common electrodes which constitute the first electric field unit group, the second electric field unit group and the third electric field unit group, respectively, inclination angles of the pixel electrodes relative to the common electrodes are different, respectively.

Optionally, in the above array substrate, in pixel electrodes and common electrodes which constitute the first electric field unit group, the second electric field unit group and the third electric field unit group, respectively, distances between the pixel electrodes and the common electrodes are different, respectively, and inclination angles of the pixel electrodes relative to the common electrodes are different, respectively.

Optionally, in the above array substrate, the first pixel sub-unit, the second pixel sub-unit and the third pixel sub-unit correspond to displaying sub-units of different colors; the distances between the pixel electrodes and the common electrodes have corresponding relationship with wavelengths of corresponding colors to make displaying units corresponding to the first pixel sub-unit, the second pixel sub-unit and the third pixel sub-unit have maximum transmittance.

Optionally, the displaying sub-units of different colors are red, green and blue displaying sub-units, respectively.

Optionally, in the above array substrate, the pixel electrodes and three common electrodes are alternately arranged in each pixel sub-unit; each pixel electrode and adjacent two common electrodes define two adjacent electric field unit groups, respectively.

Optionally, in the above array substrate, in one pixel sub-unit, the adjacent two electric field unit groups have different electric field intensities.

Optionally, in the above array substrate, in one pixel sub-unit, the respective electric field unit groups have different electric field intensities.

Optionally, in the above array substrate, the electric field unit groups of the first pixel sub-unit, the second pixel sub-unit and the third pixel sub-unit correspond to each other.

The present disclosure further provides a liquid crystal module including the above array substrate.

The present disclosure further provides a display device including the above liquid crystal module.

At least one of the above technical solutions of embodiments of the present disclosure has following beneficial effects:

By foaming electric field unit groups having different electric field intensities in the three pixel sub-units, the array substrate make a display panel have a liquid crystal layer with different liquid crystal alignments in each pixel unit. Thus, light transmittance in different directions formed by liquid crystals of different alignments can be seen when viewing from different angles, thereby solving the problem of color shift.

DETAILED DESCRIPTION

Figure 1:
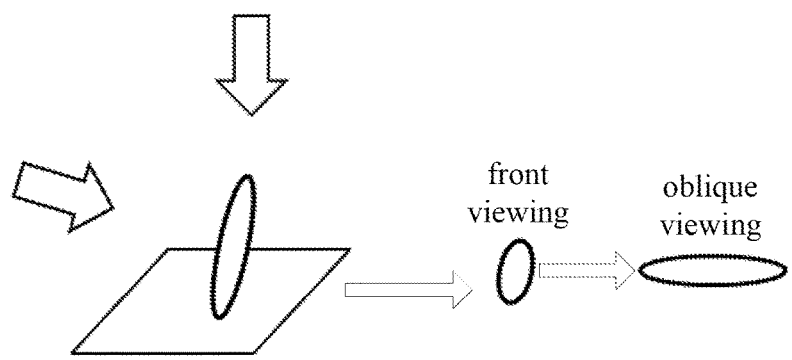
FIG. 1 is a principle diagram showing why transmittances at a front viewing direction and an oblique viewing direction are different when a liquid crystal module adopts a vertical alignment mode.

In order to make objects, technical solutions and advantages of the present disclosure apparent, hereinafter, the present disclosure will be described in details in connection with the drawings and embodiments.

An array substrate of one embodiment of the present disclosure includes a plurality of pixel units. Each of the pixel units includes at least three pixel sub-units. Each of the pixel sub-units includes at least one electric field unit group. The electric field unit group includes a pixel electrode and a common electrode. The first pixel sub-unit includes a first electric field unit group. The second pixel sub-unit includes a second electric field unit group corresponding to the first electric field unit group. The third pixel sub-unit includes a third electric field unit group corresponding to the first electric field unit group. The first electric field unit group, the second electric field unit group and the third electric field unit group have different electric field intensities.

By forming electric field unit groups having different electric field intensities in the three pixel sub-units, the array substrate enables a display panel having a liquid crystal layer with different liquid crystal alignments in each pixel unit. Thus, light transmission in different directions formed by liquid crystals of different alignments can be seen when viewing from different angles, thereby solving the problem of color shift.

With respect to the second electric field unit group and the third electric field unit group corresponding to the first electric field unit group in the first pixel sub-unit, "corresponding" refers to the meaning that electric field unit groups in different pixel sub-units are set at same positions relative to their own pixel sub-units. For example, when pixel electrodes and common electrodes in the respective electric field unit groups are both N-th pixel electrodes and M-th common electrodes (M and N may be the same or different) relative to a border at the same side of their own pixel sub-units, they are set to be corresponding electric field unit groups in different pixel sub-units.

By adopting the array substrate of one embodiment of the present application, on one hand, the first electric field unit group, the second electric field unit group and the third electric field unit group have different electric field intensities by making distances between the pixel electrodes and common electrodes in respective electric field unit groups different; and on the other hand, the first electric field unit group, the second electric field unit group and the third electric field unit group have different electric field intensities by making inclination angles of the pixel electrodes relative to the common electrodes in respective electric field unit groups different. Optionally, the first electric field unit group, the second electric field unit group and the third electric field unit group have different electric field intensities by making distances between the pixel electrodes and common electrodes in respective electric field unit groups different and making inclination angles of the pixel electrodes relative to the common electrodes in respective electric field unit groups different.

Figure 2:
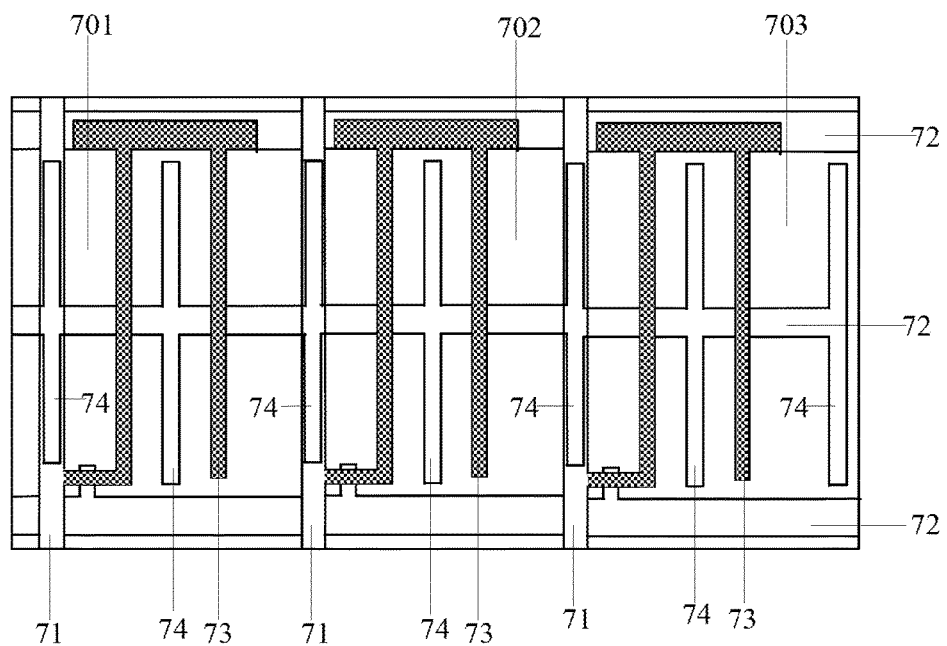
FIG. 2 is a schematic diagram illustrating partial structure of a circuit on an array substrate according to a first embodiment of the present disclosure.
Figure 3:
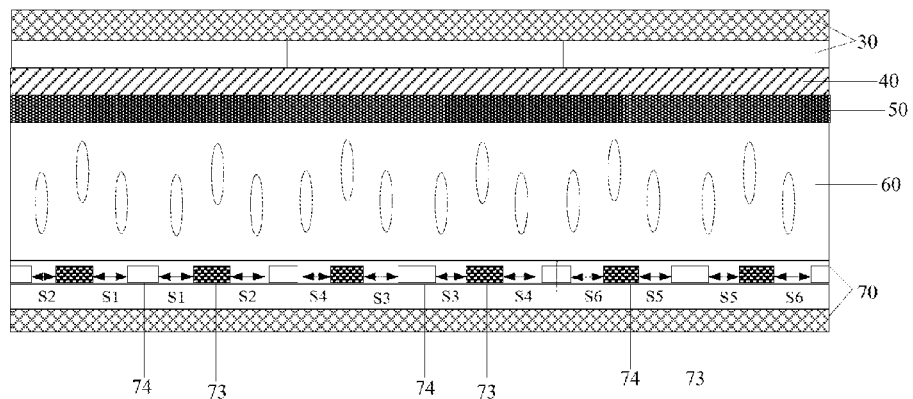
FIG. 3 is a schematic diagram illustrating a structure of a liquid module which adopts the array substrate according to the first embodiment of the present disclosure.

FIG. 2 is a schematic diagram illustrating partial structure of a circuit on an array substrate according to a first embodiment of the present disclosure; FIG. 3 is a schematic diagram illustrating a structure of a liquid module which adopts the array substrate according to the first embodiment of the present disclosure. Combined with FIG. 2 and FIG. 3, similar to that in the related art, a liquid crystal module which adopts the array substrate of the present disclosure includes:

a first substrate and a second substrate (not shown) arranged opposite to each other;

a color substrate 30, a common electrode layer 40, a dielectric layer 50, a liquid crystal layer 60 and an array substrate 70 which are sequentially arranged between the first substrate and the second substrate.

A plurality of data lines 71 and a plurality of gate lines 72 intersecting to each other are arranged on the array substrate 70. The data lines 71 are parallel to each other. The gate lines 72 are parallel to each other. A region defined by adjacent data lines 71 and adjacent gate lines 72 constitute a pixel sub-unit. Adjacent three pixel sub-units constitute a pixel unit. The three pixel sub-units usually correspond to pixel sub-units of three colors (e.g., red, green, blue) of the color substrate 30, respectively, so as to display the three colors.

One skilled in the art can understand detailed structures of the liquid crystal module including the above components which will not be described in details here.

Further, one skilled in the art can also understand that each pixel sub-unit usually includes the pixel electrode and the common electrode, an electric field is generated between the pixel electrode and the common electrode, and an electric field is also formed between the pixel electrode and the common electrode layer 40. Under joint action of the above electric fields, liquid crystal molecules in the liquid crystal layer 60 between the array substrate 70 and the common electrode layer 40 are deflected, and light penetrated the liquid crystal molecules is deflected.

In the first embodiment of the present disclosure, structures of the array substrate of the present disclosure will be described in details by taking each pixel sub-unit including two parallel pixel electrodes and three common electrodes as an example.

Referring to FIG. 3 in conjunction with FIG. 2, in the first embodiment of the present disclosure, the array substrate 70 includes a first pixel sub-unit 701, a second pixel sub-unit 702 and a third pixel sub-unit 703. The numbers of pixel electrodes 73 and common electrodes 74 in the first pixel sub-unit 701, the second pixel sub-unit 702 and the third pixel sub-unit 703 are the same and set according to same rules.

Specifically, in the first embodiment, two pixel electrodes 73 and three common electrodes 74 are alternatively arranged in one pixel sub-unit. Each pixel electrode 73 and adjacent two common electrodes 74 define two adjacent electric field unit groups, respectively. Thus, by adopting one specific embodiment of the present disclosure, four adjacent electric field unit groups are defined in one pixel sub-unit. Since the numbers of pixel electrodes 73 and common electrodes 74 disposed in the first pixel sub-unit 701, the second pixel sub-unit 702 and the third pixel sub-unit 703 are the same and set according to same rules, thus the electric field unit groups defined in respective pixel sub-units are corresponding to each other.

By adopting the first embodiment of the present disclosure, in the three pixel sub-units, the electric field intensities of the electric field unit groups corresponding to each other are different, respectively. That is, when the first pixel sub-unit 701 includes a first electric field unit group, the second pixel sub-unit 702 includes a second electric field unit group corresponding to the first electric field unit group, the third pixel sub-unit 703 includes a third electric field unit group corresponding to the first electric field unit group, electric field intensities of the first electric field unit group, the second electric field unit group and the third electric field unit group are different. The first electric field unit group may be any one of four electric field unit groups of the first pixel sub-unit 701.

Further, optionally, in each pixel sub-unit, electric field intensities of the respective electric field unit groups are also different. By adopting the above structure, in the three pixel sub-units, electric field intensities of the electric field unit groups corresponding to each other are also different, respectively; since there are a plurality of distribution areas of different electric field intensities in one pixel unit, liquid crystal molecules in the liquid crystal layer present different arrangements. When viewing from a certain angle, liquid crystals having 12 different alignments can be seen, and light transmitting in different directions is formed, thereby solving the problem of color shift.

In the first embodiment of the present disclosure, the distance between the pixel electrode 73 and the common electrode 74 in one electric field unit group may be adjusted to form liquid crystals of 12 different alignments in one pixel unit.

Referring to FIG. 2 and FIG. 3, in the three pixel sub-units, distances between the pixel electrodes 73 and the common electrodes 74 in the electric field unit groups corresponding to each other are different, respectively. Taking an electric field unit group defined by the first pixel electrode 73 and the first common electrode 74 from left to right in the first pixel sub-unit 701 as a first electric field unit group, in the first electric field unit group, a distance between the pixel electrode 73 and the common electrode 74 is S2. The second pixel sub-unit 702 includes a second electric field unit group corresponding to the first electric field unit group. Similarly, the second electric field unit group is constituted by the first pixel electrode 73 and the first common electrode 74 from left to right in the second pixel sub-unit 702. In the second electric field unit group, a distance between the pixel electrode 73 and the common electrode 74 is S4. The third pixel sub-unit 703 includes a third electric field unit group corresponding to the first electric field unit group. Similarly, the third electric field unit group is constituted by the first pixel electrode 73 and the first common electrode 74 from left to right in the third pixel sub-unit 703. In the third electric field unit group, a distance between the pixel electrode 73 and the common electrode 74 is S6. S2, S4 and S6 are different values, respectively.

Similarly, in the three pixel sub-units, distances between the pixel electrodes 73 and the common electrodes 74 in other electric field unit groups corresponding to each other are also different, respectively.

Further, as shown in FIG. 3, optionally, distances between the pixel electrodes 73 and the common electrodes in two adjacent electric field unit groups of one pixel sub-unit are also different. Thus, the first pixel sub-unit 701 is formed with electric field unit groups in which distances between the pixel electrodes 73 and the common electrodes 74 are S2, S1, S1 and S2, respectively. The second pixel sub-unit 702 is formed with electric field unit groups in which distances between the pixel electrodes 73 and the common electrodes 74 are S4, S3, S3 and S4, respectively. The third pixel sub-unit 703 is formed with electric field unit groups in which distances between the pixel electrodes 73 and the common electrodes 74 are S6, S5, S5 and S6, respectively.

Figure 4:
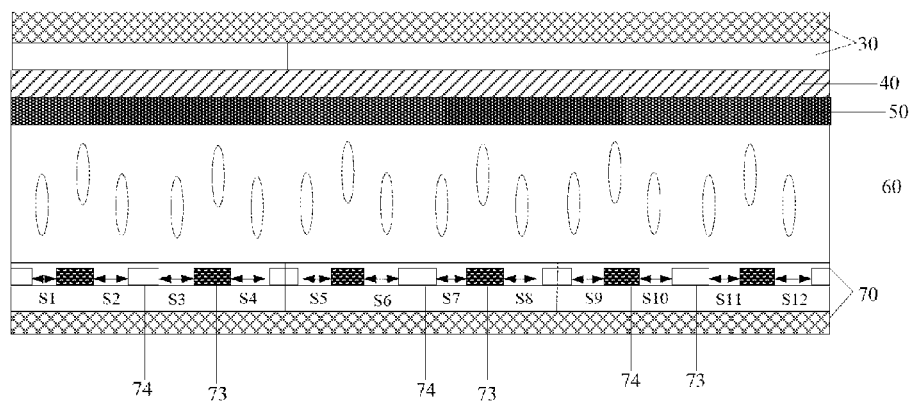
FIG. 4 is a schematic diagram illustrating another structure of a liquid module which adopts the array substrate according to the first embodiment of the present disclosure.
Figure 5:
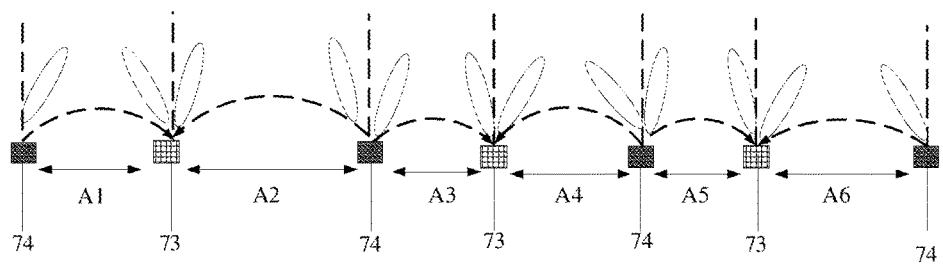
FIG. 5 is a schematic diagram showing presented status of liquid crystal modules when adopting the array substrate according to the first embodiment of the present disclosure.

Further, as shown in FIG. 4, optionally, in one pixel sub-unit, the distances between the pixel electrodes 73 and the common electrodes 74 of the respective electric field unit groups are all different. Thus, the first pixel sub-unit 701 is formed with electric field unit groups in which distances between the pixel electrodes 73 and the common electrodes 74 are S1, S2, S3 and S4, respectively. The second pixel sub-unit 702 is formed with electric field unit groups in which distances between the pixel electrodes 73 and the common electrodes 74 are S5, S6, S7 and S8, respectively. The third pixel sub-unit 703 is formed with electric field unit groups in which distances between the pixel electrodes 73 and the common electrodes 74 are S9, S10, S11 and S12, respectively Since the distances between the pixel electrodes 73 and the common electrodes 74 are different, liquid crystal molecules of different deflection structures are formed in one pixel unit. As shown in FIG. 5, when viewing from a certain angle, light transmitting in different directions can be obtained, thereby solving the problem of color shift.

Figure 6:
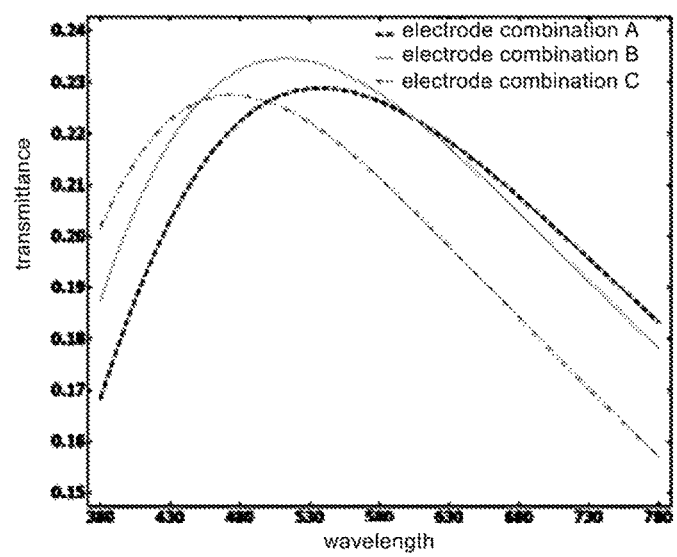
FIG. 6 is a diagram showing the relationship between transmittance of each sub-pixel and wavelengths of backlight under different combinations of electrode gaps of sub-pixels.

FIG. 6 shows the relationship between transmittance of each sub-pixel and wavelengths of backlight under different combinations of electrode gaps of sub-pixels. In order to make a display panel have a maximum transmittance, the distance between the pixel electrode 73 and the common electrode 74 of each sub-pixel unit are adjusted so as to make each sub-pixel unit have the maximum transmittance.

One skilled in the art can understand, under condition of same backlight in each sub-pixel unit, the transmittance of each sub-pixel unit is associated with electrode gaps (e.g., distances between the pixel electrodes and the common electrodes) of corresponding sub-pixel unit, and transmittances $Tr_R$, $Tr_G$, $Tr_B$ of corresponding RGB color films. The transmittances $Tr_R$, $Tr_G$, $Tr_B$ of the respective R, G and B color films are different due to different colors. In order to make the display panel have the maximum transmittance, the transmittance (Tr) of each sub-pixel unit is required to be maximum, thus, the electrode gaps in the respective sub-pixel units are required to be different.

As shown in FIG. 6, that is, in the sub-pixel unit R, in a distribution curve of transmittance against wavelength for an electrode gap combination A (S1=4 um, S2=6 um), a maximum transmittance appears at 550 nm. In the sub-pixel unit G, in a distribution curve of transmittance against wavelength for an electrode gap combination B (S3=5 um, S4=8 um), a maximum transmittance appears at 510 nm. In the sub-pixel unit B, in a distribution curve of transmittance against wavelength for an electrode gap combination C (S5=8 um, S6=8 um), a maximum transmittance appears at 450 nm. Thus, the transmittance (Tr) of the whole display panel achieves a maximum value, thereby achieving effects of improving brightness, reducing energy consumption and reducing cost.

According to the above, optionally, the relationship among S1, S2, S3, S4, S5 and S6 is as follows: S1<S3<S5, S2<S4<S6.

Adoption of the array substrate of one embodiment of the present application may not only achieve the effect of improving the color shift phenomenon, but also make sub-pixel units have the maximum transmittance so as to improve display quality.

Figure 7:
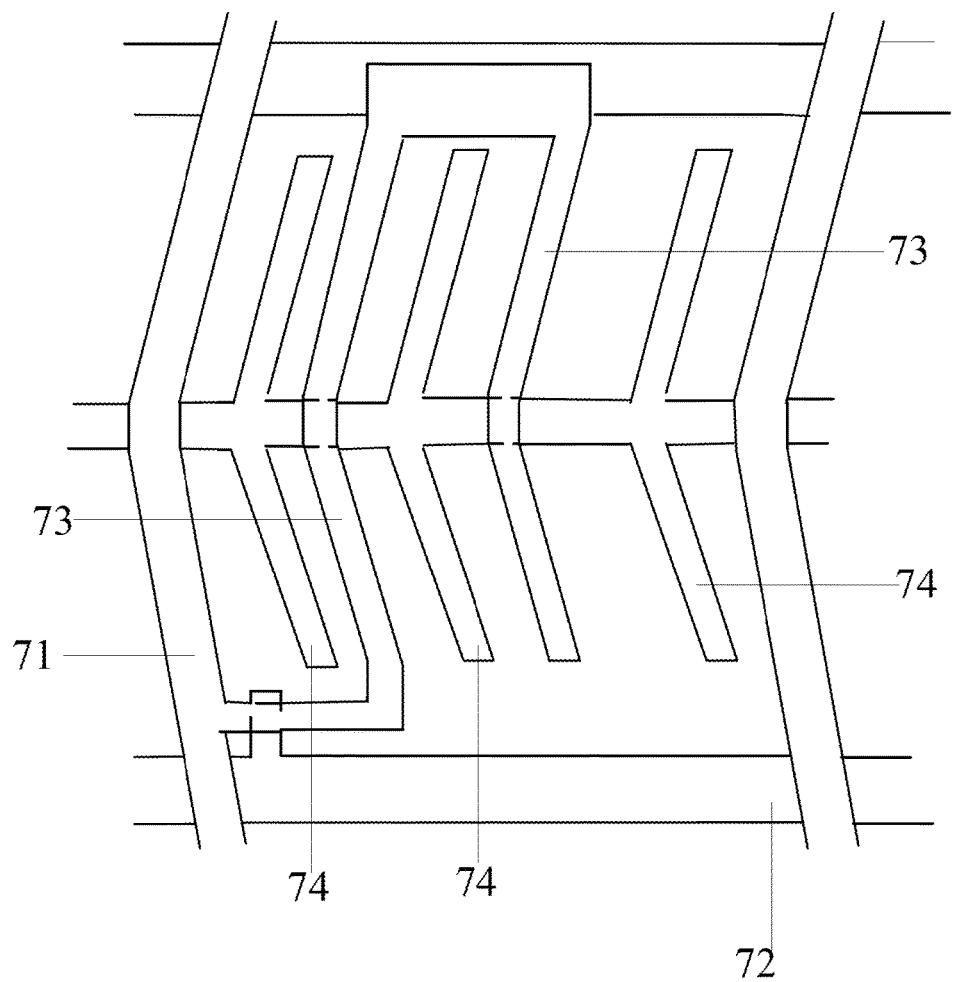
FIG. 7 is a schematic diagram showing an arrangement of pixel electrodes and common electrodes when adopting an array substrate according to a second embodiment of the present disclosure.

In addition to achieving the purpose of adjusting electric field intensities between the pixel electrodes and the common electrodes by changing distances between the pixel electrodes and the common electrodes, the array substrate of one embodiment of the present disclosure may also achieve the above purpose by changing the inclination angles of the pixel electrodes relative to the common electrodes. Referring to FIG. 7, when the pixel electrodes 73 are formed into a bent structure with respect to the common electrodes 74 and have an inclination angle, the distances between the pixel electrodes 73 and the common electrodes 74 are different due to different inclination angles. Thus, except that the pixel electrodes 73 and the common electrodes 74 are arranged in parallel, making the pixel electrodes 73 inclined or oblique with respect to the common electrodes 74 can also achieve the effect of improving color shift.

Based on the above principles, one skilled in the art should know specific setting mode for achieving the above effect by changing the inclination angle of the pixel electrode 73 relative to the common electrode 74, which will not be described in details here.

Another aspect of one embodiment of the present application further provides a liquid crystal module as shown in FIG. 3 and a display device including the liquid module. Based on the above description of the array substrate, one skilled in the art should know detailed structures of the liquid crystal module and the display device which will not be described in details.

Those described above are only embodiments of the present disclosure. It should be noted that, for those skilled in the art, improvements and substitutions may also be made without departing from the principle of the present disclosure. Those improvements and substitutions should also be considered as the scope of the present disclosure.

What is claimed is:

1. A liquid crystal module, comprising:
an array substrate;
a color substrate; and
a liquid crystal layer,
wherein:
the array substrate includes a plurality of pixel units;
a first pixel unit of the plurality of pixel units comprises a first pixel sub-unit, a second pixel sub-unit, and a third pixel sub-unit;
the first pixel sub-unit comprises a first electric field group, and the first electric field group comprises a first plurality of electric field unit groups that includes a first electric field unit group;
the second pixel sub-unit comprises a second electric field group, and the second electric field group comprises a second plurality of electric field unit groups that includes a second electric field unit group;
the third pixel sub-unit comprises a third electric field group, and the third electric field group comprises a third plurality of electric field unit groups that includes a third electric field unit group;
the first electric field unit group, the second electric field unit group, and the third electric field unit group have different electric field intensities;
each electric field unit group of the first, second, and third electric field groups comprises a pixel electrode and a common electrode arranged adjacent to each other, and the pixel electrodes and the common electrodes of the first, second, and third electric field groups are in direct contact with a same layer;
within at least one electric field group of the first, second, and third electric field groups, a distance between a first portion of the pixel electrode and a second portion of the common electrode in one of the electric field unit groups is different from a distance between a third portion of the pixel electrode and a fourth portion of the common electrode in another one of the electric field unit groups;
an orthogonal projection of the first portion onto a data line adjacent to the one electric field group is a first projection;
an orthogonal projection of the second portion onto the data line is a second projection;
an orthogonal projection of the third portion onto the data line is a third projection;
an orthogonal projection of the fourth portion onto the data line is a fourth projection; and
the first projection, the second projection, the third projection, and the fourth projection completely coincide with each other.

2. The liquid crystal module according to claim 1, wherein:
within at least one of the first, second, and third electric field groups, a distance between the pixel electrode and the common electrode in any one of the electric field unit groups is different from a distance between the pixel electrode and the common electrode in any other one of the electric field unit groups.

3. The liquid crystal module according to claim 1, wherein:
a first distance between the pixel electrode and the common electrode in one of the first plurality of electric field unit groups is different from a second distance between the pixel electrode and the common electrode in one of the second plurality of electric field unit groups;
a third distance between the pixel electrode and the common electrode in one of the third plurality of electric field unit groups is different from the second distance and the first distance;
the first pixel sub-unit is associated with a first color having a first wavelength;
the first distance is specified such that a maximum transmittance of light through the first pixel sub-unit occurs at the first wavelength;
the second pixel sub-unit is associated with a second color having a second wavelength;
the second distance is specified such that a maximum transmittance of light through the second pixel sub-unit occurs at the second wavelength;

the third pixel sub-unit is associated with a third color having a third wavelength; and the third distance is specified such that a maximum transmittance of light through the third pixel sub-unit occurs at the third wavelength.

4. The liquid crystal module according to claim 3, wherein the first, second, and third colors are red, green, and blue, respectively.

5. The liquid crystal module according to claim 1, wherein:

within all of the first, second, and third electric field groups, a distance between the pixel electrode and the common electrode in any one of the electric field unit groups is different from a distance between the pixel electrode and the common electrode in any other one of the electric field unit groups.

6. The liquid crystal module according to claim 1, wherein:

within each of the first, second, and third electric field groups, the distance between the pixel electrode and the common electrode in one of the electric field unit groups is different from the distance between the pixel electrode and the common electrode in another one of the electric field unit groups.

7. The liquid crystal module according to claim 1, wherein:

locations of the second plurality of electric field unit groups within the second pixel sub-unit match locations of the first plurality of electric field unit groups within the first pixel sub-unit, respectively; and locations of the third plurality of electric field unit groups within the third pixel sub-unit match locations of the first plurality of electric field unit groups within the first pixel sub-unit, respectively.

8. A display device comprising the liquid crystal module according to claim 1.

9. The display device according to claim 8, wherein:

within at least one of the first, second, and third electric field groups, a distance between the pixel electrode and the common electrode in any one of the electric field unit groups is different from a distance between the pixel electrode and the common electrode in any other one of the electric field unit groups.

10. The display device according to claim 9, wherein:

a first distance between the pixel electrode and the common electrode in one of the first plurality of electric field unit groups is different from a second distance between the pixel electrode and the common electrode in one of the second plurality of electric field unit groups;

a third distance between the pixel electrode and the common electrode in one of the third plurality of electric field unit groups is different from the second distance and the first distance;

the first pixel sub-unit is associated with a first color having a first wavelength;

the first distance is specified such that a maximum transmittance of light through the first pixel sub-unit occurs at the first wavelength;

the second pixel sub-unit is associated with a second color having a second wavelength;

the second distance is specified such that a maximum transmittance of light through the second pixel sub-unit occurs at the second wavelength;

the third pixel sub-unit is associated with a third color having a third wavelength; and the third distance is specified such that a maximum transmittance of light through the third pixel sub-unit occurs at the third wavelength.

11. The display device according to claim 10, wherein the first, second, and third colors are red, green, and blue, respectively.

12. The display device according to claim 8, wherein:

within all of the first, second, and third electric field groups, a distance between the pixel electrode and the common electrode in any one of the electric field unit groups is different from a distance between the pixel electrode and the common electrode in any other one of the electric field unit groups.

13. The display device according to claim 8, wherein:

within each of the first, second, and third electric field groups, the distance between the pixel electrode and the common electrode in one of the electric field unit groups is different from the distance between the pixel electrode and the common electrode in another one of the electric field unit groups.

14. The liquid crystal module according to claim 1, wherein:

a pixel electrode in one of the first plurality of electric field unit groups, a pixel electrode in one of the second plurality of electric field unit groups, and a pixel electrode in one of the third plurality of electric field unit groups have a first shape; and a common electrode in one of the first plurality of electric field unit groups, a common electrode in one of the second plurality of electric field unit groups, and a common electrode in one of the third plurality of electric field unit groups have a second shape that is different from the first shape.

15. The liquid crystal module according to claim 1, wherein:

a first portion of the liquid crystal layer opposite to the first pixel sub unit is a first thickness;

a second portion of the liquid crystal layer opposite to the second pixel sub unit is a second thickness;

a third portion of the liquid crystal layer opposite to the third pixel sub unit is a third thickness;

the first thickness is equal to both the second thickness and the third thickness;

in response to the liquid crystal module being powered, liquid crystal molecules in a fourth portion of the liquid crystal layer form 12 different arrangements; and the fourth portion of the liquid crystal layer is opposite to the first pixel unit.

16. The liquid crystal module according to claim 1, wherein:

a location of the second electric field unit group within the second pixel sub unit matches a location of the first electric field unit group within the first pixel sub unit;

a location of the third electric field unit group within the third pixel sub unit matches the location of the first electric field unit group within the first pixel sub unit;

the first electric field unit group comprises a first pixel electrode and a first common electrode arranged at a first inclination angle relative to each other;

the second electric field unit group comprises a second pixel electrode and a second common electrode arranged at a second inclination angle relative to each other;

the third electric field unit group comprises a third pixel electrode and a third common electrode arranged at a third inclination angle relative to each other;

the first inclination angle is an angle between a portion of the first pixel electrode located a first distance from a first gate line and a second distance from a second gate line and a portion of the first common electrode located the first distance from the first gate line and the second distance from the second gate line;

the second inclination angle is an angle between a portion of the second pixel electrode located the first distance from the first gate line and the second distance from the second gate line and a portion of the second common electrode located the first distance from the first gate line and the second distance from the second gate line;

the third inclination angle is an angle between a portion of the third pixel electrode located the first distance from the first gate line and the second distance from the second gate line and a portion of the third common electrode located the first distance from the first gate line and the second distance from the second gate line;

the first gate line and the second gate line are adjacent to the first pixel unit;

the second inclination angle is different from the first inclination angle; and the third inclination angle is different from the first inclination angle and the second inclination angle.

* * * * *